US008170131B2

(12) United States Patent  (10) Patent No.: US 8,170,131 B2
Guey et al.  (45) Date of Patent: May 1, 2012

(54) METHOD AND ARRANGEMENT FOR REDUCING FEEDBACK DATA IN A MIMO COMMUNICATION SYSTEM

(75) Inventors: Jiann-Ching Guey, Cary, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 757 days.

(21) Appl. No.: 12/281,963

(22) PCT Filed: Mar. 7, 2006

(86) PCT No.: PCT/SE2006/000296
§ 371 (c)(1),
(2), (4) Date: Jan. 22, 2009

(87) PCT Pub. No.: WO2007/102760
PCT Pub. Date: Sep. 13, 2007

(65) Prior Publication Data
US 2009/0233559 A1    Sep. 17, 2009

(51) Int. Cl.
*H04B 7/02* (2006.01)
(52) U.S. Cl. ........................... 375/267; 375/219; 455/69
(58) Field of Classification Search .................. 375/267, 375/219; 455/69
See application file for complete search history.

(56) References Cited

U.S. PATENT DOCUMENTS

| 4,408,332 | A  | * | 10/1983 | Sari ............................... 375/232 |
| 2002/0159415 | A1 | * | 10/2002 | Pan et al. ...................... 370/335 |
| 2006/0093067 | A1 | * | 5/2006 | Jalali et al. .................... 375/299 |
| 2006/0115030 | A1 | * | 6/2006 | Erving et al. ................. 375/348 |
| 2006/0251198 | A1 | * | 11/2006 | Ma et al. ....................... 375/350 |
| 2009/0154587 | A1 | * | 6/2009 | Cheong et al. ................ 375/267 |

* cited by examiner

*Primary Examiner* — Shuwang Liu
*Assistant Examiner* — Michael Neff (57) ABSTRACT

The present invention relates to a method and arrangement for reducing feedback data in a communication system, said communication system comprising a number of transmitter antennas, $n_T$, and a number of receiver antennas, $n_R$, for parallel spatially independent transmission and reception of signals, wherein a channel response is represented by a matrix (G) containing $n_R \times n_T$ complex variables. The method comprises the steps of: decomposing an expression of said channel response matrix (G) into products of a unitary transform (V), $n_R \times n_T$ diagonal matrix ($\Lambda$) and a conjugate transpose of a unitary matrix (W). Choosing said unitary matrix (W) such that its diagonal elements are real, substituting said channel response matrix (G) with a representative subset of elements in said decomposed expression of said channel response matrix (G), said representative subset comprising diagonal of a first matrix ($\Lambda$) and lower triangle of a second matrix (W) excluding the diagonal.

21 Claims, 6 Drawing Sheets

METHOD AND ARRANGEMENT FOR REDUCING FEEDBACK DATA IN A MIMO COMMUNICATION SYSTEM

TECHNICAL FIELD

The present invention relates to a method and arrangement for reducing feedback data in a communication system. In particular, the present invention relates to a method and arrangement for reducing data feedback, especially channel response, in a Multiple-input Multiple-Output (MIMO) system.

BACKGROUND OF THE INVENTION

The existing wireless mobile communication systems provide several types of services and mostly depend on channel coding to overcome any inferiority of channels. However, due to the increasing demands, for example for a high-quality multimedia services, in which users can communicate with anyone regardless of time and place, the existing services have evolving into data-oriented services. Accordingly, there is a high demand for next generation wireless transmission technology for transmitting the larger amount of data at a lower error rate. In particular, it is very important to transmit data at a high rate in a link in which the amount of required data is large.

For the next generation wireless communication, various antenna systems have been proposed. For example, a Multiple-input multiple-output (MIMO) system increases spectrum efficiency through all of transmission antennas without excessive use of a frequency bandwidth. Generally, MIMO is classified into Space-Time Coding (STC), Diversity, Beam Forming (BF), and Spatial Multiplexing (SM) according to the transmission structure and scheme of a transmitter, all of which provide high data rate and reliability.

A MIMO system adopts multiple antennas or array antenna to transmit/receive data in the transmitter and receiver. Multiple antennas are provided in different spatial positions, with different fading features, thus the received signals of adjacent antennas can be approximated as uncorrelated entirely as long as the spacing between adjacent antennas for transmitting/receiving signals in the MIMO system is large enough. The MIMO system takes full advantage of the spatial characteristics of multipath for implementing space diversity transmission and reception.

Figure 1:
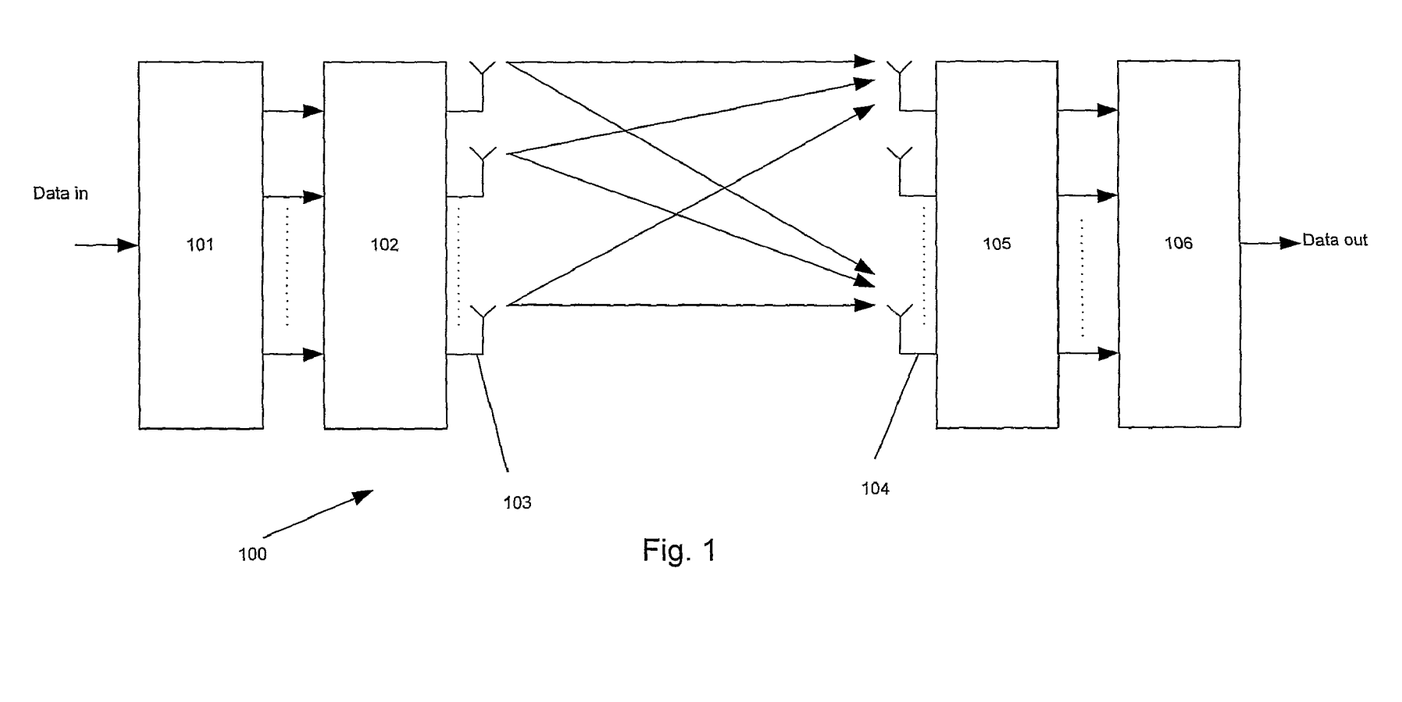
FIG. 1 is a schematic diagram of a prior art MIMO system.

FIG. 1 illustrates an exemplary and simplified MIMO system 100 constructed by M Tx antennas 103 and N Rx antennas 104. As mentioned earlier, the antenna spacing between the Tx antennas and Rx antennas in the MIMO system in FIG. 1 is generally big enough, to guarantee the spatial un-correlation of signals. As FIG. 1 shows, in the transmitter, MIMO architecture unit 101 first transforms a channel of data stream into M channels of parallel sub data streams; then, multiple access transform unit 102 performs multiplex processing; finally, the corresponding M Tx antennas 103 transmit the signal simultaneously into the wireless channels. The MIMO architecture unit 101 can adopt any one of the MIMO processing methods, such as STTC (Space Time Trellis Code), space-time block code, space-time Turbo code, BLAST code and etc. While multiple access transform unit 102 can implement TDD, FDD or CDMA.

At the receiver site N Rx 104 antennas receive the broadcasted signals, which are transformed by multiple access inverse transform unit 105, performing multiple access demultiplexing processing, and provided to a MIMO detection unit 106.

Usually, a MIMO antenna system with $n_R$ receive and $n_T$ transmit antennas operating in a frequency non-selective channel is described by the following matrix representation:

$$y = Gx + z \quad (1)$$

Wherein y is the $n_R \times 1$ received signal vector, G is the $n_R \times n_T$ MIMO channel response, z is the independent and identically distributed elements Additive White Gaussian Noise (AWGN) at the receiver with individual variance of $\sigma^2_z$ and x is the $n_T \times 1$ transmitted signal vector with a certain power constraint.

The best performance of such a system is achieved when the channel response is known to the transmitter so that the transmit signals can be designed accordingly. This is disclosed, for example in G. G Raleigh & J. M. Cioffi, "*Spatio-temporal Coding For Wireless Communication*" IEEE trans. On Comm. Vol. 46, no. 3 Mar. 1998, pp. 357-366, and K. C. Zangi and L. G Krasny "*Capacity achieving Transmitter and Receiver Pairs for MISO Channels*" IEEE Transaction on Wireless Communications Vol. 2 No. 6 Nov. 2003, pp 1204-1216.

In many cases, the channel response is only known to the receiver through the reference signals sent by the transmitter on a forward link and therefore requires being explicitly fed back to the transmitter on a reverse link. Such a feedback may sometimes be a significant overhead especially for a configuration with a large number of antennas. It may also require a substantial amount of computational power.

Conventionally, the entire channel matrix G is fed back from the receiver. For the case of two transmit antennas and one receiver antenna, for example, the close-loop mode in $3^{rd}$ Generation Project Plan (3GPP) feeds back one phase factor optimized for the frequency selective channel to adjust one of the transmitter antennas.

SUMMARY OF THE INVENTION

It is therefore an object of the present invention to provide a method and an arrangement in a MIMO antenna system that reduces feedback overhead. Thus, one problem solved by the present invention is to extend a simple solution to the complex MIMO.

Moreover, the present invention extends and generalises the close-loop mode concept in 3GPP and similar concepts to any number of transmit and receive antennas and also to channels with much greater frequency selectivity.

These objects are achieved using a method for reducing amount of data in a transmission in a communication system. The communication system comprises a number of transmitter antennas, $n_T$, and a number of receiver antennas, $n_R$, for parallel spatially independent transmission and reception of signals. A channel response is represented by a matrix containing $n_R \times n_T$ complex variables. The invention comprises substituting the channel response matrix with a representative subset of elements in the decomposed expression of the channel response matrix, in the data transmission.

A method of reducing feedback data in a communication system, the communication In more detail, the method of the invention comprises the steps of: decomposing an expression of the channel response matrix into products of a unitary transform, $n_R \times n_T$ diagonal matrix and a conjugate transpose of a unitary matrix, choosing the unitary matrix such that its diagonal elements are real, substituting the channel response matrix with a representative subset of elements in the decomposed expression of the channel response matrix. The representative subset comprising diagonal of a first matrix and lower triangle of a second matrix excluding the diagonal.

Preferably, the first matrix is $n_R \times n_R$ non-trivial truncation of the $n_R \times n_T$ diagonal matrix, and the second matrix is $n_T \times n_R$ non-trivial truncation of the corresponding $n_T \times n_T$ unitary matrix. The second matrix is represented by:

$$\tilde{W} = \begin{pmatrix} w_{1,1} & \cdots & w_{1,n_R} \\ \vdots & \ddots & \vdots \\ w_{n_T,1} & \cdots & w_{n_T,n_R} \end{pmatrix}$$

According to one embodiment of the invention, the second matrix is solved by choosing a solution and rotating the phase of each column in the matrix such that the diagonal elements become real. Thus, the second matrix is restored from its lower triangle by:

solving $<w_1, w_1> = 1$ for $w_{1,1}$,
solving $<w_1, w_2> = 0$ and $<w_2, w_2> = 0$ for $w_{1,2}$ and $w_{2,2}$, and
continuing restoration process until all columns are restored.

Preferably, $<w_1, w_1> = 1$ for $w_{1,1}$ is determined by solving $$w_{1,1} = \sqrt{1 - \sum_{j=2}^{n_T} |w_{j,1}|^2}.$$

Preferably, $<w_1, w_2> = 0$ and $<w_2, w_2> = 0$ is determined by solving:

$$\langle w_1, w_2 \rangle = 0$$

$$\langle w_2, w_2 \rangle = 1$$

The method implies continuing restoration process until all columns are restored by solving:

$$\langle w_1, w_l \rangle = 0$$
$$\vdots$$
$$\langle w_{l-1}, w_l \rangle = 0$$
$$\langle w_l, w_l \rangle = 1$$

wherein l is an integer ranging from 1 to $n_R$.

Most preferably, one advantage of the invention is that the number of real coefficients required for specifying the channel response matrix is $2n_R n_T - n^2_R$.

According to one aspect of the invention, the system comprises frequency selective channels and a frequency range is divided into a number of consecutive segments and the number of segments are chosen such that a channel response matrix being a function of a frequency, is substantially constant and the channel response matrix is then approximated in each segment using its mean and substitution of each segment. Thus, the system comprises frequency selective channels and a continuous channel response in a frequency domain is approximated by a finite number of frequency non-selective channels.

Preferably, a receiver end determines and feeds back to a transmit end the representative subset.

According to another aspect of the invention a method is provided for reducing feedback data in a Multiple-input Multiple-Output (MIMO) communication system. The system comprises at least two transmitter antennas, $n_T$, and at least two receiver antennas, $n_R$, for parallel spatially independent transmission and reception of signals. A channel response is represented by a matrix containing $n_R \times n_T$ complex variables. The method comprising the steps of: decomposing an expression of the channel response matrix into products of a unitary transform, $n_R \times n_T$ diagonal matrix and conjugate transpose of a unitary matrix, where the unitary matrix is chosen such that its diagonal elements are real, substituting the channel response matrix with a representative subset of elements in the decomposed expression of the channel response matrix, the representative subset comprising diagonal of a first matrix being $n_R \times n_R$ non-trivial truncation of the $n_R \times n_T$ diagonal matrix and lower triangle of a second matrix being $n_T \times n_R$ non-trivial truncation of the corresponding $n_T \times n_T$ unitary matrix excluding the diagonal.

According to another aspect of the invention a method is provided for a Single-Input Single-Output (SISO) communication system, the system comprising one transmitter antenna and a receiver antenna for transmission and reception of signals, wherein a channel response is represented by a matrix. The method comprises the steps of: decomposing an expression of the channel response matrix into products of a unitary transform, a diagonal matrix and Hermitian transpose of a unitary matrix, where the unitary matrix is chosen such that its diagonal elements are real, substituting the channel response matrix with a representative subset of elements in the decomposed expression of the channel response matrix, the representative subset comprising diagonal of a first matrix being non-trivial truncation of the diagonal matrix and lower triangle of a second matrix being non-trivial truncation of the corresponding unitary matrix excluding the diagonal.

The invention also relates to an arrangement in a communication network. The communication network comprises a number of transmitter antennas, $n_T$, and a number of receiver antennas, $n_R$. Each of the antennas being arranged for substantially parallel and spatially independent transmission and reception of signals, wherein a channel response is realized as a matrix containing $n_R \times n_T$ complex variables. The arrangement further comprises a data processing unit for decomposing an expression of the channel response matrix into products of a unitary transform, a diagonal matrix and a conjugate transpose of a unitary matrix, where the unitary matrix is chosen such that its diagonal elements are real and means for substituting and transmitting the channel response matrix with a representative subset of elements in the decomposed expression of the channel response matrix, wherein the representative subset comprises diagonal of a first matrix and lower triangle of a second matrix excluding the diagonal. The arrangement further comprises means for generating the first matrix as a $n_R \times n_R$ non-trivial truncation of the $n_R \times n_T$ diagonal matrix. Preferably, the arrangement further comprises means for generating the second matrix as a $n_T \times n_R$ non-trivial truncation of the corresponding $n_T \times n_T$ unitary matrix.

The invention also relates to a Multiple-Input Multiple-Output (MIMO) architecture unit in a MIMO system comprising a number of transmitter antennas, $n_T$, and a number of receiver antennas, $n_R$, each of the antennas being arranged for substantially parallel and spatially independent transmission and reception of signals, wherein a channel response is realized as a matrix containing $n_R \times n_T$ complex variables. The architecture unit further comprises a data processing unit for decomposing an expression of the channel response matrix into products of a unitary transform, a diagonal matrix and a conjugate transpose of a unitary matrix, where the unitary matrix is chosen such that its diagonal elements are real and means for substituting and transmitting the channel response matrix with a representative subset of elements in the decomposed expression of the channel response matrix, wherein the representative subset comprises diagonal of a first matrix and lower triangle of a second matrix excluding the diagonal.

The invention also relates to a Single-input Single-Output (SISO) receiver unit in a SISO system comprising a transmitter antenna and a receiver antenna, each of the antennas being arranged for independent transmission and reception of signals, wherein a channel response is realized as a matrix containing complex variables. The architecture unit further comprises a data processing unit for decomposing an expression of the channel response matrix into products of a unitary transform, a diagonal matrix and a conjugate transpose of a unitary matrix, where the unitary matrix is chosen such that its diagonal elements are real and means for substituting and transmitting the channel response matrix with a representative subset of elements in the decomposed expression of the channel response matrix, wherein the representative subset comprises diagonal of a first matrix and lower triangle of a second matrix excluding the diagonal.

The invention may be realized as a computer program product for reducing feedback data in a communication system, the communication system comprising a number of transmitter antennas, $n_T$, and a number of receiver antennas, $n_R$, for parallel spatially independent transmission and reception of signals, wherein a channel response is represented by a matrix containing $n_R \times n_T$ complex variables. Thus, the computer program product comprises: an instruction set for receiving, decomposing and storing an expression of the channel response matrix, the decomposing comprising a function for producing products of the unitary transform, $n_R \times n_T$ diagonal matrix, and a Hermitian transpose of the unitary matrix, an instruction set for choosing the unitary matrix in such a way that its diagonal elements are real, an instruction set for producing a representative subset of the elements in the decomposed expression, which comprises diagonal of $n_R \times n_R$ non-trivial truncation of the $n_R \times n_T$ diagonal matrix and lower triangle of $n_T \times n_R$ non-trivial truncation of the $n_T \times n_T$ unitary matrix excluding diagonals, and an instruction set for substituting the channel response matrix with the representative subset of the elements in the decomposed expression.

DETAILED DESCRIPTION OF PREFERRED EMBODIMENTS

Figure 2:
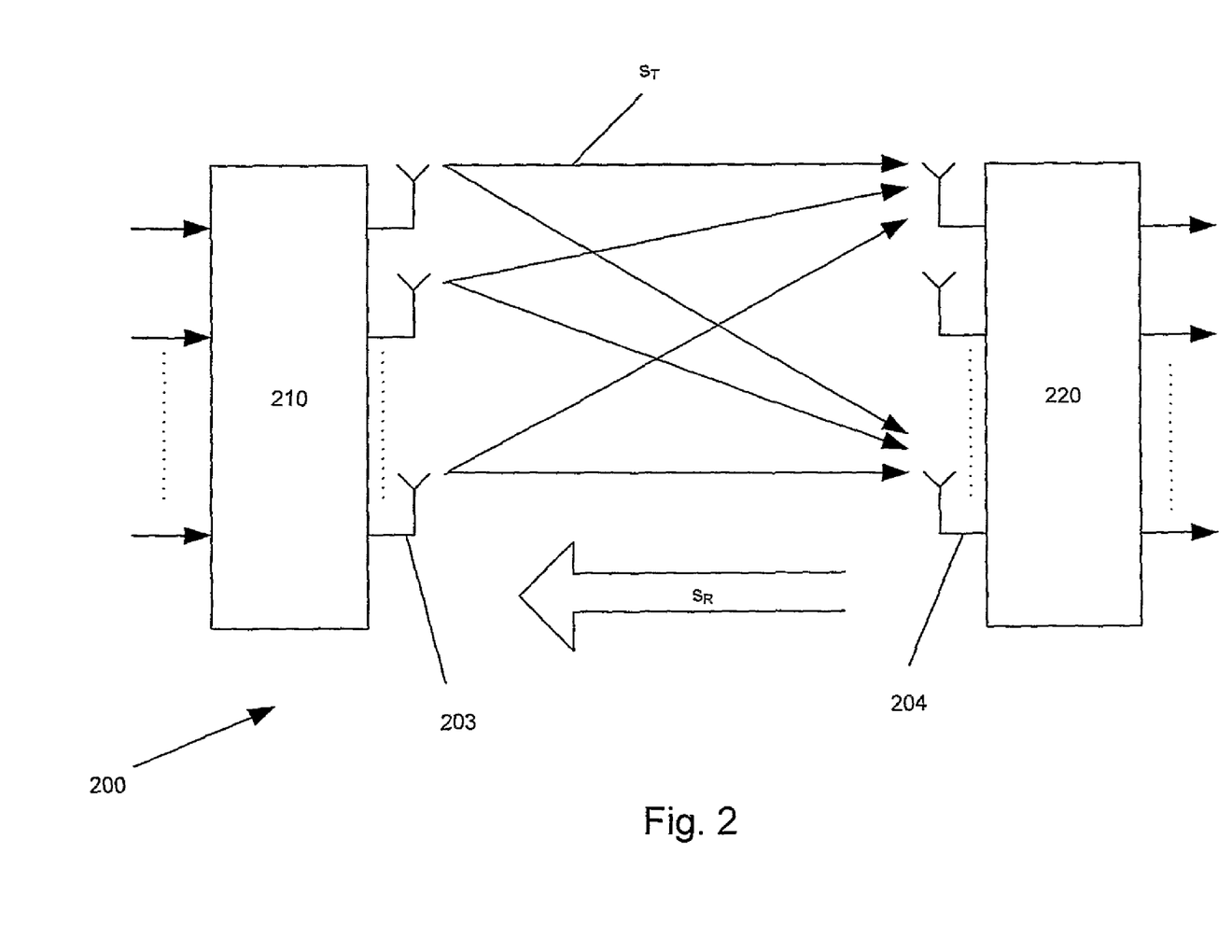
FIG. 2 is a block diagram of a schematic system according to the present invention.

FIG. 2 illustrates in a schematic way, a simplified MIMIO system 200 having transmitter 210 and receiver 220. Transmitter site comprises $n_T$ transmitter antennas 203 and receiver site comprises $n_R$ receiver antennas 204. The transmitter transmits signals $s_T$ to the receiver and the receiver processes and feeds back data signal $s_R$ containing the channel response matrix to the transmitter. Signal $s_R$ is feedback overhead to enable transmitter to perform an optimal transmission. The present invention provides a new method to reduce the feedback overhead.

Figure 3:
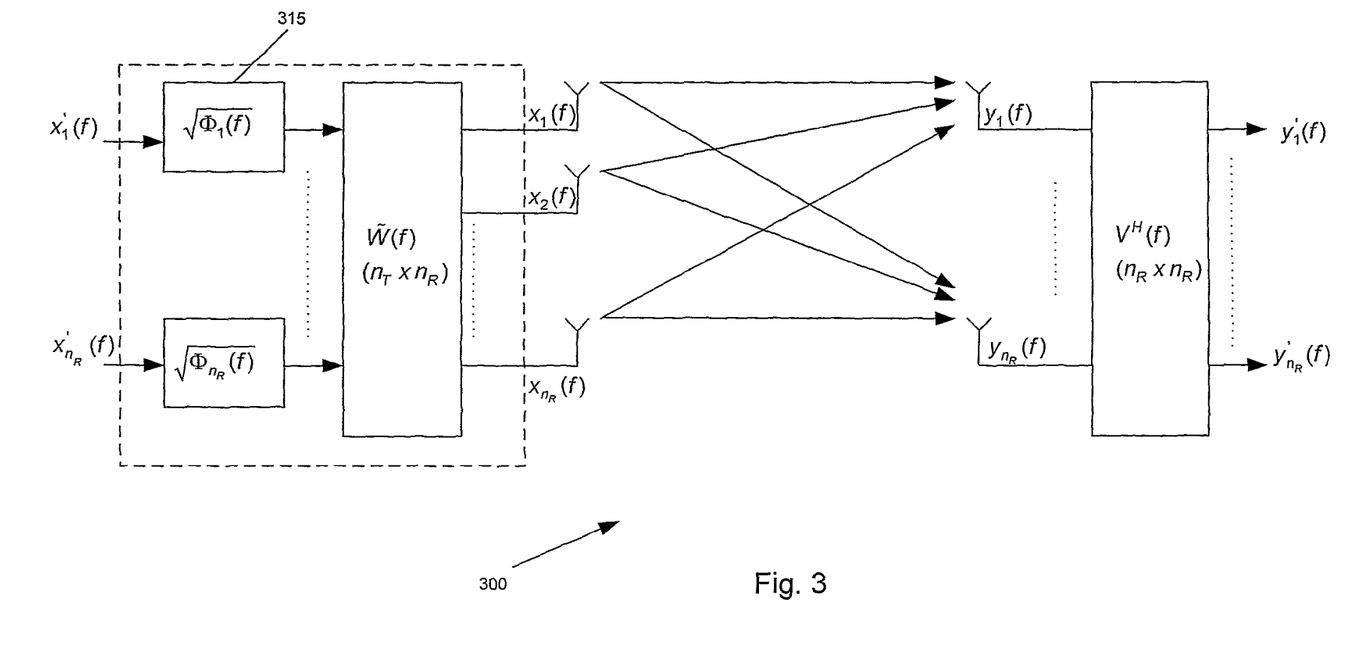
FIG. 3 illustrates schematically a block diagram for dissecting the optimal transmit/receive architecture.

FIG. 3 illustrates a dissected optimal transmit/receive architecture of a MIMO system 300. Preferably, the optimal transmit and receive architecture of a MIMO system consists of a series of linear transforms that decompose the MIMO channel into min($n_R$, $n_T$) parallel and independent spatial channels, as illustrated, in this case for $n_R \leq n_T$ in frequency-selective channel. The unitary transform V at the receiver is related to the MIMO channel response G through a Singular Value Decompression (SVD) given by $$G = V \Lambda W^H = V[\tilde{\Lambda} 0][\tilde{W}_{n_T \times n_R} \tilde{W}^\perp]^H = V \tilde{\Lambda} \tilde{W}^H \quad (2)$$

wherein W is the corresponding $n_T \times n_T$ unitary matrix multiplied from the right, $\Lambda$ is an $n_R \times n_T$ diagonal matrix whose diagonal elements $\{\sqrt{\lambda_1}, \ldots, \sqrt{\lambda_{n_R}}\}$ (assuming full rank) are the square roots of the eigenvalues of $GG^H$ and, $\tilde{W}$ and $\tilde{\Lambda}$ are their $n_T \times n_R$ and $n_R \times n_T$ non-trivial truncations, respectively. Thus, the expression of the channel response matrix G is decomposed into the products of V, $\Lambda$ and conjugate or Hermitian transpose of W, and W is chosen such that its diagonal elements are real. The gain $\sqrt{\Phi_m}$ of a first stage filter 315 in each transmit data stream can scale the parallel channel gain according to the desired optimization criterion and is generally a function of $\tilde{\Lambda}$ and $\sigma_z^2$. In the case of maximizing the capacity of the channel, for example, it may be a Water-Filling term.

FIG. 3 also illustrates that the transmitter must have information on $\tilde{W}$, $\tilde{\Lambda}$ and $\sigma_z^2$ to generate the desired transmit signal. However, unlike the arbitrary channel matrix G, $\tilde{W}$ is part of a unitary matrix with a certain structure that can be exploited. If $\tilde{W}$ is rewritten in column vector form:

$$\tilde{W} = \begin{pmatrix} w_{1,1} & \cdots & w_{1,n_R} \\ \vdots & \ddots & \vdots \\ w_{n_T,1} & \cdots & w_{n_T,n_R} \end{pmatrix} = [w_1 w_2 \ldots w_{n_R}], \quad (3)$$

and note that since W is unitary, its column vectors are orthogonal:

$$\langle w_m, w_n \rangle = w_m^H \cdot w_n = \sum_{j=1}^{n_T} w_{j,m}^* \cdot w_{j,n} = \delta[m-n]. \quad (4)$$

Without loss of generality, it is assumed that all the elements in $w_1$ are known except $w_{1,1}$. Since the columns of $\tilde{W}$ is uniquely determined up to a phase rotation, consequently $w_{1,1}$ can be chosen as real and non-negative such that its solution to $\langle w_1, w_1 \rangle = 1$, and $$w_{1,1} = \sqrt{1 - \sum_{j=2}^{n_T} |w_{j,1}|^2}, \quad (5)$$

is unique. Assuming further, without loss of generality, that $w_2$ is known except $w_{1,2}$ and $w_{2,2}$ and that $w_{2,2}$ is chosen to be real and non-negative. Consequently, the two unknowns may be uniquely determined by solving the following equations:

$$\langle w_1, w_2 \rangle = 0 \quad (6)$$

$$\langle w_2, w_2 \rangle = 1$$

By continuing this process, it can be shown that the 1 unknowns $\{w_{1,l}, \ldots, w_{l,l}\}$ in $w_l$ can be uniquely determined by solving the equations $$\langle w_1, w_l \rangle = 0 \quad (7)$$
$$\vdots$$
$$\langle w_{l-1}, w_l \rangle = 0$$
$$\langle w_l, w_l \rangle = 1$$

Given that $w_{l,l}$ is real and non-negative. Therefore, the number of real numbers required to completely specify $\tilde{W}$ is $$2 \sum_{l=1}^{n_R} (n_T - l) = 2n_R n_T - n_R(n_R + 1). \quad (8)$$

Together with the $n_R$ real eigenvalues in $\tilde{\Lambda}$, this reduces the number of real coefficients required to specify G from $2n_R n_T$ to $2n_R n_T - n^2_R$, i.e. for example in the feedback signal from the receiver to the transmitter.

Thus, the invention according to one preferred embodiment comprises sending the diagonal of $\tilde{\Lambda}$ and an abbreviated or simplified $\tilde{W}$, as feedback data from the receiver instead of sending G, which has $n_R \times n_T$ complex variables.

Decomposing G using Eq. 2 provides a number of solutions for $\tilde{W}$. Accordingly, a solution with real diagonal elements is selected. This is obtained by choosing any solution and rotating the phase of each column in the matrix such that the diagonal elements become real. Then only the lower triangle elements, i.e. elements found only in the lower triangle of the matrix, excluding the main diagonal ($I_{ij}=0$ if $j<j$) are fed back, which are sufficient to restore $\tilde{W}$.

$\tilde{W}$ is restored by:
Solving $<w_1, w_1>=1$ for $w_{1,1}$, from Eq. (5). The solution exists and is unique science $w_{1,1}$, is the only unknown.
Solving $<w_1, w_2>=0$ and $<w_2, w_2>=0$ using Eq. (6) for $w_{1,2}$ and $w_{2,2}$. The solution exists and is unique as $w_{1,1}$ and $w_{2,2}$ are the only unknowns.
Continuing the process until all columns are restored, by solving Eq. (7) for the unknowns $\{w_{1,l}, \ldots, w_{l,l}\}$, wherein l=1 to $n_R$.

Thus, for the common case of MIMO spatial multiplexing where $n_R \approx n_T$, the reduction in feedback overhead can be as much as approx. 50%.

A frequency selective channel is one whose channel response matrix G is a function of the frequency f, or G(f). According to another aspect of the present invention, for frequency selective channel equation (1) will be represented by $$y(f) = G(f) \times (f) + z(f), \quad (9)$$

and the same approach as mentioned earlier can be applied to across the frequency. Instead of $2n_R n_T$ real functions of f in G(f), the feedback now consists of $2n_R n_T - n^2_R$ real functions of f. For example each element in the MIMO channel frequency response G(f) is Fourier transform of a digital filter such as an Finite Impulse Response (FIR) filter, e.g. having L taps.

The present invention is applied to frequency selective channel case is by assuming each entry in the concise representation, as descried earlier, as a function of frequency instead of scalar, using Transmit Diversity with Constrained Feedback (TDFC) to convert each function to a finite number of taps.

One problem which can occur is to quantify the number of taps required to accurately represent the eigenvalues $\tilde{\Lambda}(f)$ and their corresponding eigenvectors $\tilde{W}(f)$. For large number of transmit antennas, the components in $\tilde{\Lambda}(f)$ are almost flat, and therefore require much less L taps to represent total number of FIR coefficients, it is possible to apply Transmit Diversity with Constrained Feedback (TDCF) techniques to the elements in $\tilde{\Lambda}(f)$ and $\tilde{W}(f)$, see for example L. Krasny and J. Guey, "Transmit Diversity with Constrained Feedback", 14$^{th}$ IST Mobile & Wireless Communications Summit, Dresden, June 2005. Feedback overhead reduction is still possible as long as the Signal-Noise Ratio (SNR) loss due to the mismatch is smaller than feeding back the original channel response with equal amount of compression.

Alternatively, it is possible to approximate the continuous channel response in the frequency domain by a finite number of frequency non-selective channels and then apply the same principle to each sub-band. From sample point of view, an impulse response with L-tap can be represented by L equally spaced sampling points in the frequency domain. Therefore, dividing the frequency response of the channels into L sub-bands should be reasonable approximation and the proportion of the reduction in feed-back overhead is the same as the flat fading channel.

Thus, for frequency selective channel, the frequency range is divided into L consecutive segments. The number of segments are chosen such that G(f) is substantially constant. G(f) is then approximated in each segment using its mean and the aforementioned frequency non-selective technique is applied to each segment.

Figure 4:
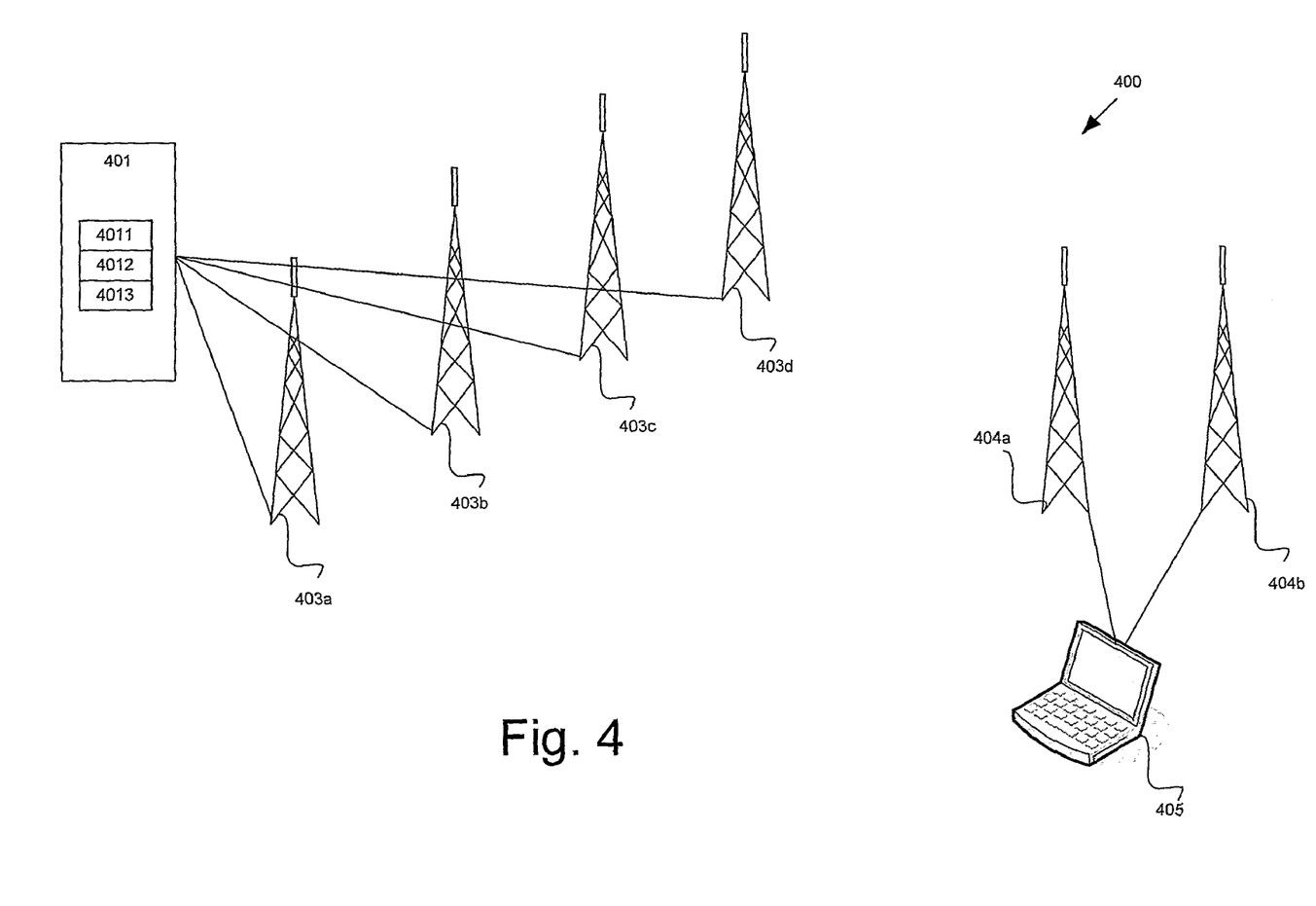
FIG. 4 is a schematic view of a communication network implementing the present invention.

FIG. 4 illustrates an embodiment for evaluating the loss in performance due this quantization process. The system 400 comprises a transmitter base station 401, four transmit antennas 403a-403d and two receive antennas 404a and 404b connected to a user device 405. The transmitter base station and the user device are provided with a processing unit (not shown) for processing the data in accordance with the present invention. Reference signs 4011 to 4013 relate to exemplary processing arrangements in one side of the communication network for processing the matrix.

Figure 5:
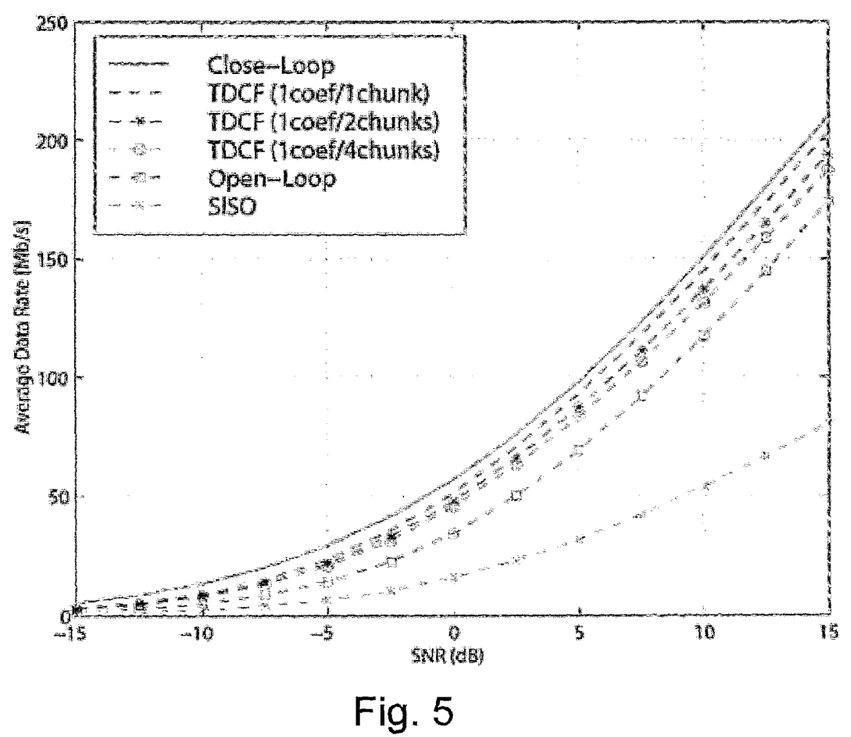
FIG. 5 is a diagram illustrating loss due to approximation in extension to frequency selective channel.

The system is assumed to operate in for example 3GPP Typical Urban (TU) channel, scaled four times to 20 MHz bandwidth with L=40 taps. Thus the frequency response of the channel is divided into 40 sub-bands or "chunks" each with a bandwidth of 500 KHz. FIG. 5 illustrates the MIMO channel's mutual information averaged over a large number of realizations. The performance results for the ideal close-loop, open-loop and Single Input Single Output (SISO) are given as references. Between the ideal close-loop and open-loop results, three curves with different degree of approximation are situated. The dashed curve corresponds to the case where the average (over frequency) of the channel's frequency response in each chunk is used as its flat fading approximation. The loss with respect to the ideal case is very small. Even when the averaging range increases to two and four chunks, marked with stars and circles respectively, there is still significant gain over the open loop approach.

Although, the invention is described in an exemplary way to systems having $n_R \leq n_T$, it will be appreciated by a skilled person that the teachings of the invention may equally be applied to systems having $n_R > n_T$.

Figure 6:
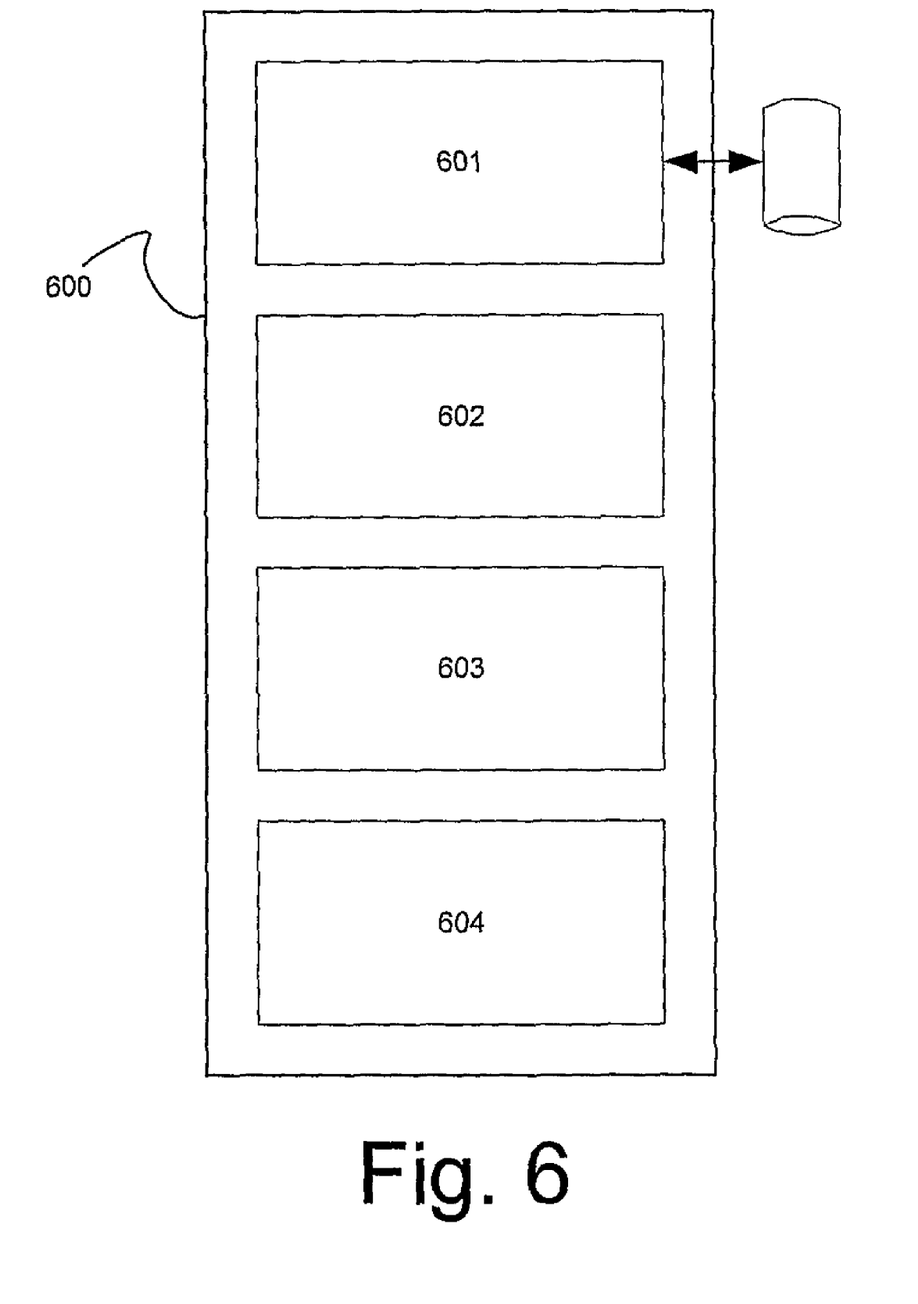
FIG. 6 is a block diagram illustrating the components of an program product computer according to the invention.

The method of the invention may be implemented as hardware and/or software. An instruction set 600, as illustrated in FIG. 6, for implementing the invention in the receiver architecture may comprise:

Instructions 601 for receiving, decomposing and storing an expression of the channel response matrix G The decomposing comprising a function 602 for producing products of the unitary transform V, the $n_R \times n_T$ diagonal matrix, $\Lambda$, and the Hermitian transpose of the unitary matrix, W, Instructions 602 for choosing the unitary matrix in such a way that its diagonal elements are real, Instructions 603 for producing a representative subset of the elements in the decomposed expression, which comprise diagonal of $n_R \times n_R$ non-trivial truncation of said $n_R \times n_T$ diagonal matrix $\Lambda$ and lower triangle of $n_T \times n_R$ non-trivial truncation of the $n_T \times n_T$ unitary matrix, W, excluding the diagonal Instructions 604 for substituting the channel response matrix G with the representative subset of the elements in the decomposed expression.

The invention is not limited to the described and illustrated embodiments; especially the number of transmitters, receivers and antennas may vary.

The invention claimed is:

1. A method of reducing feedback data in a communication system, said communication system comprising a number of transmitter antennas, $n_T$, and a number of receiver antennas, $n_R$, for parallel spatially independent transmission and reception of signals, wherein a channel response is represented by a matrix (G) containing $n_R \times n_T$ complex variables, the method comprising the steps of:

decomposing by a data processing device, an expression of said channel response matrix (G) into products of a unitary transform (V), $n_R \times n_T$ diagonal matrix ($\Lambda$) and a conjugate transpose of a unitary matrix (W), choosing said unitary matrix (W) such that its diagonal elements are real, substituting said channel response matrix (G) with a representative subset of elements in said decomposed expression of said channel response matrix (G), said representative subset comprising diagonal elements of a first matrix ($\tilde{\Lambda}$) and lower triangle elements of a second matrix ($\tilde{W}$) excluding diagonal elements.

2. The method of claim 1, wherein said first matrix ($\tilde{\Lambda}$) is $n_R \times n_R$ non-trivial truncation of said $n_R \times n_T$ diagonal matrix ($\Lambda$).

3. The method of claim 1, wherein said second matrix ($\tilde{W}$) is $n_T \times n_R$ non-trivial truncation of said corresponding $n_T \times n_T$ unitary matrix (W).

4. The method according to claim 1, wherein said second matrix is represented by:

$$\tilde{W} = \begin{pmatrix} w_{1,1} & \cdots & w_{1,n_R} \\ \vdots & \ddots & \vdots \\ w_{n_R,1} & \cdots & w_{n_R,n_R} \end{pmatrix}.$$

5. The method of claim 4, wherein said second matrix ($\tilde{W}$) is solved by choosing a solution and rotating the phase of each column in the matrix such that the diagonal elements become real.

6. The method according to claim 5, wherein said second matrix ($\tilde{W}$) is restored from its lower triangle by:

solving $<W_1, W_1> = 1$ for $W_{1,1}$, solving $<W_1, W_2> = 0$ and $<W_2, W_2> = 0$ for $w_{1,2}$ and $w_{2,2}$, and continuing restoration process until all columns are restored.

7. The method of claim 6, wherein $<W_1, W_1> = 1$ for $W_{1,1}$ is determined by solving $$W_{1,1} = \sqrt{1 - \sum_{j=2}^{n_T} |W_{j,1}|^2}$$

wherein j is an integer.

8. The method of claim 6, wherein $<W_1, W_2> = 0$ and $<W_2, W_2> = 0$ is determined by solving:

$(W_1, W_2) = 0$ $(W_2, W_2) = 1$.

9. The method of claim 6, wherein continuing restoration process until all columns are restored by solving:

$(W_1, W_l) = 0$ $\vdots$ $(W_{l-1}, W_l) = 0$ $(W_l, W_l) = 1$ wherein l is an integer ranging from 1 to $n_R$.

10. The method according to claim 1, wherein number of real coefficients required to specify said channel response matrix (G) is $2n_R n_T - n^2_R$.

11. The method according to claim 1, wherein said system comprises frequency selective channels and a frequency range is divided into a number (L) of consecutive segments and the number of segments are chosen such that a channel response matrix (G(f)) being a function of a frequency (f), is substantially constant and said channel response matrix is then approximated in each segment using its mean and substitution of each segment.

12. The method according to claim 1, wherein said system comprises frequency selective channels and a continuous channel response in a frequency domain is approximated by a finite number of frequency non-selective channels.

13. The method according to claim 1, wherein a receiver end determines and feeds back to a transmit end said representative subset.

14. A method of reducing feedback data in a Multiple-Input Multiple-Output (MIMO) communication system, said system comprising at least two transmitter antennas, $n_T$, and at least two receiver antennas, $n_R$, for parallel spatially independent transmission and reception of signals, wherein a channel response is represented by a matrix (G) containing $n_R \times n_T$ complex variables, the method comprising the steps of:

decomposing by a data processing device, an expression of said channel response matrix (G) into products of a unitary transform (V), $n_R \times n_T$ diagonal matrix ($\Lambda$) and conjugate transpose of a unitary matrix (W), where said unitary matrix (W) is chosen such that its diagonal elements are real, substituting said channel response matrix (G) with a representative subset of elements in said decomposed expression of said channel response matrix (G), said representative subset comprising diagonal elements of a first matrix ($\tilde{\Lambda}$) being $n_R \times n_R$ non-trivial truncation of said $n_R \times n_T$ diagonal matrix ($\Lambda$) and lower triangle elements of a second matrix ($\tilde{W}$) being $n_T \times n_R$ non-trivial truncation of said corresponding $n_T \times n_T$ unitary matrix (W) excluding the diagonal elements.

15. A method of reducing feedback data in a Single-Input Single-Output (SISO) communication system, said system comprising one transmitter antenna and a receiver antenna for transmission and reception of signals, wherein a channel response is represented by a matrix (G), the method comprising the steps of:

decomposing by a data processing device, an expression of said channel response matrix (G) into products of a unitary transform (V), a diagonal matrix ($\Lambda$) and Hermitian transpose of a unitary matrix (W), where said unitary matrix (W) is chosen such that its diagonal elements are real,     substituting said channel response matrix (G) with a representative subset of elements in said decomposed expression of said channel response matrix (G), said representative subset comprising diagonal elements of a first matrix ($\tilde{\Lambda}$) being non-trivial truncation of said diagonal matrix ($\Lambda$) and lower triangle elements of a second matrix ($\tilde{W}$) being non-trivial truncation of said corresponding unitary matrix (W) excluding diagonal elements.

16. An arrangement in a communication network, said communication network comprising a number of transmitter antennas, $n_T$, and a number of receiver antennas, $n_R$, each of said antennas being arranged for substantially parallel and spatially independent transmission and reception of signals, wherein a channel response is realized as a matrix (G) containing $n_R \times n_T$ complex variables, wherein said arrangement further comprises:

a data processing device for decomposing an expression of said channel response matrix (G) into products of a unitary transform (V), a diagonal matrix ($\Lambda$) and a conjugate transpose of a unitary matrix (W), where said unitary matrix (W) is chosen such that its diagonal elements are real; and     means for substituting and transmitting said channel response matrix (G) with a representative subset of elements in said decomposed expression of said channel response matrix (G), wherein said representative subset comprises diagonal elements of a first matrix ($\tilde{\Lambda}$) and lower triangle elements of a second matrix ($\tilde{W}$) excluding diagonal elements.

17. The arrangement of claim 16, further comprising means for generating said first matrix ($\tilde{\Lambda}$) as a $n_R \times n_R$ non-trivial truncation of said $n_R \times n_T$ diagonal matrix ($\Lambda$).

18. The arrangement of claim 16, further comprising means for generating said second matrix ($\tilde{W}$) as a $n_T \times n_R$ non-trivial truncation of said corresponding $n_T \times n_T$ unitary matrix (W).

19. A Multiple-Input Multiple-Output (MIMO) architecture arrangement in a MIMO system comprising a number of transmitter antennas, $n_T$, and a number of receiver antennas, $n_R$, each of said antennas being arranged for substantially parallel and spatially independent transmission and reception of signals, wherein a channel response is realized as a matrix (G) containing $n_R \times n_T$ complex variables, wherein said architecture arrangement further comprises:

a data processing device for decomposing an expression of said channel response matrix (G) into products of a unitary transform (V), a diagonal matrix ($\Lambda$) and a conjugate transpose of a unitary matrix (W), where said unitary matrix (W) is chosen such that its diagonal elements are real; and     means for substituting and transmitting said channel response matrix (G) with a representative subset of elements in said decomposed expression of said channel response matrix (G), wherein said representative subset comprises diagonal elements of a first matrix ($\tilde{\Lambda}$) and lower triangle elements of a second matrix ($\tilde{W}$) excluding diagonal elements.

20. A Single-Input Single-Output (SISO) receiver arrangement in a SISO system comprising a transmitter antenna and a receiver antenna, each of said antennas being arranged for independent transmission and reception of signals, wherein a channel response is realized as a matrix (G) containing complex variables, wherein said receiver arrangement further comprises:

a data processing device for decomposing an expression of said channel response matrix (G) into products of a unitary transform (V), a diagonal matrix ($\Lambda$) and a conjugate transpose of a unitary matrix (W), where said unitary matrix (W) is chosen such that its diagonal elements are real; and     means for substituting and transmitting said channel response matrix (G) with a representative subset of elements in said decomposed expression of said channel response matrix (G), wherein said representative subset comprises diagonal elements of a first matrix ($\tilde{\Lambda}$) and lower triangle elements of a second matrix ($\tilde{W}$) excluding diagonal elements.

21. A non-transitory computer program product reducing feedback data in a communication system, said communication system comprising a number of transmitter antennas, $n_T$, and a number of receiver antennas, $n_R$, for parallel spatially independent transmission and reception of signals, wherein a channel response is represented by a matrix (G) containing $n_R \times n_T$ complex variables, the computer program product comprising:

an instruction set for receiving, decomposing and storing an expression of the channel response matrix (G),     said decomposing comprising a function for producing products of the unitary transform (V), $n_R \times n_T$ diagonal matrix, ($\Lambda$), and a Hermitian transpose of the unitary matrix (W),     an instruction set for choosing said unitary matrix in such a way that its diagonal elements are real,     an instruction set for producing a representative subset of the elements in the decomposed expression, which comprises diagonal elements of $n_R \times n_R$ non-trivial truncation of said $n_R \times n_T$ diagonal matrix ($\Lambda$) and lower triangle elements of $n_T \times n_R$ non-trivial truncation of the $n_T \times n_T$ unitary matrix (W) excluding diagonal elements, and     an instruction set for substituting said channel response matrix (G) with said representative subset of the elements in the decomposed expression.

\* \* \* \* \*